United States Patent [19]

Kirknes

[11] Patent Number: 5,734,332
[45] Date of Patent: Mar. 31, 1998

[54] IDENTIFICATION DEVICE

[75] Inventor: Steffen Kirknes, Selbustrand, Norway

[73] Assignee: Micro Design AS, Selbustrand, Norway

[21] Appl. No.: 379,494

[22] PCT Filed: Jun. 30, 1993

[86] PCT No.: PCT/NO93/00103

§ 371 Date: Mar. 30, 1995

§ 102(e) Date: Mar. 30, 1995

[87] PCT Pub. No.: WO94/28976

PCT Pub. Date: Dec. 22, 1994

[51] Int. Cl.[6] ................................. G01S 15/04
[52] U.S. Cl. .................. 340/825.54; 340/825.31; 342/44; 310/313 R
[58] Field of Search ............... 340/825.71, 825.31, 340/825.54; 342/44, 42, 51; 310/313 R

[56] References Cited

U.S. PATENT DOCUMENTS

| | | | |
|---|---|---|---|
| 4,096,477 | 6/1978 | Epstein et al. | 342/44 |
| 4,703,327 | 10/1987 | Rossetti et al. | 342/51 X |
| 4,734,698 | 3/1988 | Nysen et al. | 342/44 |
| 4,737,790 | 4/1988 | Skeie et al. | 342/51 |
| 4,746,830 | 5/1988 | Holland | 310/313 R X |

Primary Examiner—Michael Horabik
Assistant Examiner—William H. Wilson, Jr.
Attorney, Agent, or Firm—Pittenger & Smith, P.C.

[57] ABSTRACT

An identification device is provided which includes an inactive code carrier, such as a standing acoustic wave component, a frequency mixing section, and a double antenna input. Each of the antennas are tuned to a separate predetermined transmitted signal wherein the frequencies are different. The two separately received RF frequencies are mixed to produce an intermediate frequency having the sum or difference of the two received frequencies. The intermediate frequency is coupled to the standing acoustic wave device which applies a coded signal to the intermediate frequency. The intermediate frequency is then recombined with one of the original incoming RF frequencies to be retransmitted from the identification device. The mixer section can include a diode and a coil for matching the impedance of the incoming signal with the inactive code carrier. The code carrier or standing acoustic wave component is usually tuned to the lower intermediate frequency and thus, is a selective filter for the frequencies emanating from the mixing section.

10 Claims, 1 Drawing Sheet

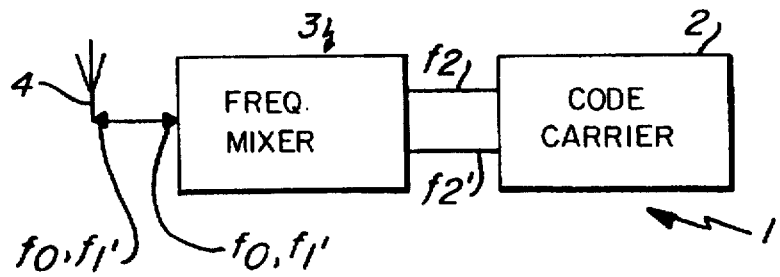
Fig_1
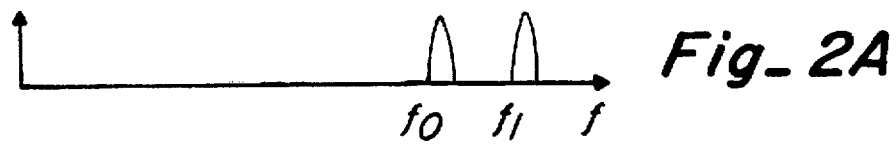
Fig_2A
Fig_2B
Fig_3A
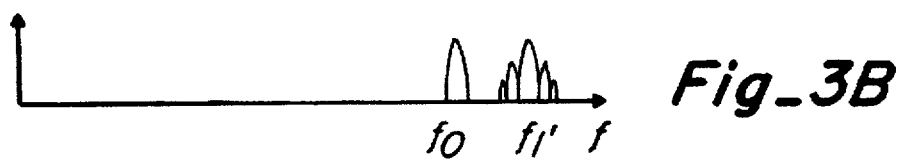
Fig_3B
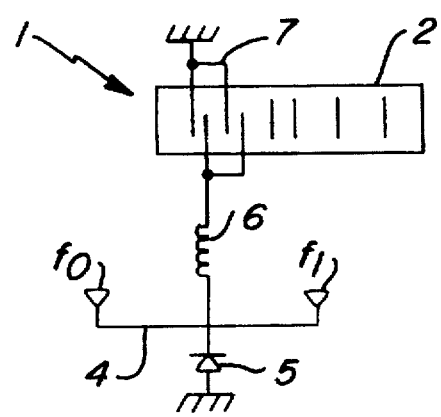
Fig_4

# IDENTIFICATION DEVICE

FIELD OF THE INVENTION

The present invention concerns a method for individual identification using electronic interrogation, and an identification chip for this purpose.

BACKGROUND OF THE INVENTION

The invention is based upon an identification chip having an inactive code carrier, which typically comprises a so-called SAW (Surface Acoustic Wave)-component. Such SAW-components are well known for individual identification. The SAW-component is coded, so that each chip has its own code, which gives a unique identification of the chip, and the object to which it is fastened. In addition, each chip contains an antenna, and optionally components for impedance matching and physical encapsulation.

The use of such indentification chips is based upon a central unit comprising a transmitter and a receiver, generating a microwave signal, which is transmitted and received by the antenna on the identification chip. The signal is then converted to an acoustic surface wave, which propagates along the SAW-component, and gives reflections, mirroring the code of this component. These reflected signals are then converted to an electronic signal. This signal is transmitted from the chip and is received by the receiver in the central unit, where it is further processed for dermining the individual identification.

The are many different embodiments of these components in respect of code methods, code length, physical geometry, choice of material, etc. Furthermore, it is also known to use so-called BAW (Bulk Acoustic Wave)—components for similar purposes.

A disadvantage with SAW-chips is that they are relatively narrow-banded, so that each kind of chip must be manufactured with a special geometry. This makes it more difficult to provide efficient utilization of ultra-high frequencies above 1 GHz,

SUMMARY OF THE INVENTION

It is therefore an object of the present invention to provide a method and a device for individual identification using electronic interrogation of the above mentioned kind which permits a more flexible use of frequencies.

The object of the invention is achieved with an identification chip for use in connection with the invention.

BRIEF DESCRIPTION OF THE DRAWINGS

In the following, a preferred embodiment of the invention will be described with reference to the accompanying drawings, in which:

FIG. 1 is a block diagram of a device for use according to present invention,

FIG. 2a and 2b are frequency diagrams for signals transmitted from the transmitter/receiver unit, FIG. 3a and 3b are frequency diagrams for reflected, coded signal, and FIG. 4 is a more detailed drawing of the components which are a part of the device according to present invention.

DESCRIPTION OF THE PREFERRED EMBODIMENTS

FIG. 1 shows an identification chip according to present invention. The identification chip is generally denoted 1, and comprises a code carrier 2, e.g. a SAW-component, a frequency mixer 3, and an antenna 4. Signals from a transmitter (not shown) are received by the antenna 4 and are propagated via the mixer 3, to the code carrier 2. From the code carrier 2 a signal is reflected via the mixer 3 and transmitted by the antenna 4, back to the transmitter/receiver unit (not shown).

FIG. 2a is a frequency diagram illustrating the signal which is transmitted from the transmitter. In this example of an embodiment, an interrogation signal $f_1$ is transmitted together with a carrier signal $f_0$. This signal is received by the antenna 4 in the identification chip 1. In the mixer 3, a mixed signal $f_2$, shown in FIG. 2b, is extracted and taken to the code carrier 2. The signal $f_2$ preferably has a frequency which is the frequency difference of the signals $f_1$ and $f_0$.

FIG. 3a shows the reflected signal $f_2$, from the code carrier 2. This signal $f_2$, has superimposed thereon the indiviual code carrier 2. Signal $f_2$, is then again mixed, so that an identification coded mixing signal denoted $f_1$, is formed, as shown in FIG. 3b. As a result the transmitted and received signals $f_0$, $f_1$; $f_0$, $f_1$; have a much higher frequency than the signals $f_2$; $f_2$, which are used internally in the indentification chip 1.

In FIG. 4 is shown a specific embodiment of present invention. An identification chip 1 comprises a SAW-component 2 of known kind. The antenna 4 is an aperture connected microstrip antenna. Furthermore, the mixer 3 from FIG. 1 comprises a diode 5. The antenna 4 is connected to a transducer 7 via an impedance match 6. The transducer 7 converts the electronic signal to and from a surface acoustic wave. The antenna 4 receives signals with frequencies $f_1$ and $f_0$. These signals are mixed by the diode 5, so that a mixed difference signal is transferred to the transducer 7 and is converted to a surface acuostic wave for the code carrier 2.

In a further embodiment the mixing signal can come from a frequency source which is internal of the identification chip.

It is also possible to use this technology with other kinds of code carriers, such as BAW (Bulk Acoustic Wave) components.

The mixer 3 may constitute more than one diode, or be acheived in other ways which are known to the person skilled in the art.

It is known in the art that code carriers, such as an acoustic wave component, are designed to work with a specific RF frequency which is usually in the VHF frequency range. The present invention utilizes this characteristic by selecting and transmitting two different frequencies which are received by the identification device and mixed in the mixer section of the device. The difference of the frequencies which is an intermediate frequency and which matches the designed frequency of the component is coupled and processed. The component, thus, acts as a selective filter tuned to the lower intermediate frequency which can be better handled and processed by the component. In this way, the received RF signals can be transmitted in the gigahertz or UHF range while the code carrier can operate in its more efficient VHF range.

I claim:

1. Method for individual identification using electronic interrogation by transmission and reception of signals of a certain frequency from a transmitter/receiver unit, wherein an identification chip (1), comprising an inactive code carrier (2), such as a SAW-component, and an antenna (4), where the antenna (4) receives the transmitted signal which then is applied to the code carrier (2), and a signal, superimposed with the individual code of the code carrier, is reflected from the code carrier (2), characterized by comprising the following steps:

transmission, from the transmitter/receiver unit, of a first and a second signal ($f_0$, $f_1$) of different frequencies, mixing the two signals ($f_0$, $f_1$) after reception thereof by the antenna (4), to provide a third signal ($f_2$), having a frequency which is a difference of the frequencies of the first and the second signals ($f_0$, $f_1$), applying the third signal ($f_2$) to the code carrier (2), so that the code carrier reflects a first coded signal ($f_{2'}$) having a frequency corresponding to the frequency of the third signal ($f_2$), mixing the first coded signal ($f_{2'}$) with the first transmitted signal ($f_0$) resulting in a second coded signal ($f_{1'}$), having a frequency corresponding to the frequency of the second transmitted signal ($f_1$), and transmitting by the antenna (4), the second coded signal ($f_{1'}$) to the transmitter/receiver unit.

2. Identification chip for individual identification using electronic interrogation by transmission and reception of a signal from a transmitter/receiver unit, having a certain frequency, where the identification chip (1) comprises an inactive code carrier (2), such as a SAW-component, and an antenna (4), where the antenna (4) is provided for receiving the transmitted signal, which then is applied to the code carrier (2), and the code carrier (2) provides a reflected signal superimposed with the code of the code carrier (2), characterized by the antenna (4) being provided to receive two signals ($f_0$, $f_1$) having different frequencies, a mixer (3), provided for mixing the two signals ($f_0$, $f_1$) resulting in a third signal ($f_2$) having a frequency which is the difference frequency of the first and the second signals ($f_0$, $f_1$), a signal path (6, 7) provided for applying the mixed signal ($f_2$) to the code carrier (2), for the provision of a reflected, coded signal ($f_{2'}$) from the code carrier, wherein the signal path (6, 7) applies the reflected, coded signal ($f_{2'}$) to the mixer (3), and the mixer is further provided for mixing the reflected, coded signal ($f_{2'}$) with one of the transmitted signals ($f_0$) for the provision of a second coded signal ($f_{1'}$) having a frequency corresponding to the second transmitted signal ($f_1$), and which is supplied to the antenna (4) for reflection to the transmitter/receiver unit.

3. Identification chip according to claim 2, characterized by the signal path (6, 7) comprising a transducer (7).

4. Identification chip according to claim 2, characterized by the mixer (3) comprising a diode (5).

5. Identification chip according to claim 2, characterized by the mixer (3) comprising a plurality of diodes (5).

6. Identification chip according to claim 2, characterized by the signal path (6, 7) further comprising an inactive network (6) for impedance matching.

7. Identification chip according to claim 2, characterized by the antenna (4) including a plurality of aperture connected micro strip antennas.

8. Identification chip according to claim 2, characterized by the code carrier (2) being a surface acoustic wave component.

9. Identification chip according to claim 2, characterized by the code carrier (2) being a bulk acoustic wave component.

10. Identification chip according to claim 2, characterized by the code carrier (2) including a frequency source.

* * * * *